United States Patent
Coldrey et al.

(10) Patent No.: US 9,331,374 B2
(45) Date of Patent: May 3, 2016

(54) MIMO COVERAGE OVER BI-DIRECTIONAL LEAKY CABLES

(75) Inventors: Mikael Coldrey, Landvetter (SE); Henrik Asplund, Stockholm (SE); Martin Johansson, Molndal (SE); Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 875 days.

(21) Appl. No.: 13/338,522

(22) Filed: Dec. 28, 2011

(65) Prior Publication Data

US 2013/0162500 A1    Jun. 27, 2013

(30) Foreign Application Priority Data

Dec. 22, 2011 (EP) .................. PCT/EP2011/073867

(51) Int. Cl.
*H01Q 1/00* (2006.01)
*H01Q 13/20* (2006.01)
*H04B 5/00* (2006.01)

(52) U.S. Cl.
CPC ............. *H01Q 1/007* (2013.01); *H01Q 13/203* (2013.01); *H04B 5/0018* (2013.01)

(58) Field of Classification Search
CPC ........ H01Q 1/20; H01Q 1/241; H01Q 9/0407
USPC .......................................... 343/904, 757, 720
See application file for complete search history.

(56) References Cited

U.S. PATENT DOCUMENTS

| | | | |
|---|---|---|---|
| 5,465,395 A | 11/1995 | Bartram | |
| 2002/0016170 A1* | 2/2002 | Sabat et al. | 455/436 |
| 2006/0143662 A1* | 6/2006 | Easterling et al. | 725/76 |
| 2007/0010279 A1* | 1/2007 | Matsushita | 455/523 |
| 2007/0296578 A1* | 12/2007 | Duff | 340/567 |
| 2008/0051056 A1* | 2/2008 | Sugiyama et al. | 455/326 |
| 2010/0245194 A1* | 9/2010 | Sawazaki et al. | 343/743 |
| 2011/0234338 A1 | 9/2011 | Takahashi | |

FOREIGN PATENT DOCUMENTS

| | | |
|---|---|---|
| CN | 101218710 A | 7/2008 |
| CN | 101841343 A | 9/2010 |
| EP | 0 442 259 A1 | 8/1991 |
| EP | 0 630 070 A1 | 5/1994 |
| WO | 2007004932 A1 | 1/2007 |

OTHER PUBLICATIONS

Tago et al. "Design and Characteristics of Radiating Pair Cable" International Wire and Cable Symposium Proceedings, vol. 32, pp. 30-36, 1963.
Written Opinion dated Apr. 10, 2015, issued in Singapore Patent Application No. 11201402175U, 11 pages.
Office Action dated Jun. 18, 2015, issued in Chinese Patent Application No. 201180075750.X, 7 pages.

* cited by examiner

*Primary Examiner* — Dameon E Levi
*Assistant Examiner* — Collin Dawkins
(74) *Attorney, Agent, or Firm* — Rothwell, Figg, Ernst & Manbeck, P.C.

(57) ABSTRACT

The invention relates to a wireless communications system for communicating with user equipment located inside a physical structure. The system comprise a node having at least two antenna ports and being adapted for wireless communication with the user equipment, and at least one leaky cable having two ends wherein each end of the at least one leaky cable is connected to one of the antenna ports of the node. The at least one leaky cable is provided at least partially inside the physical structure and being adapted for wireless communication over a radio channel with the user equipment.

13 Claims, 11 Drawing Sheets

Prior Art

MIMO COVERAGE OVER BI-DIRECTIONAL LEAKY CABLES

CROSS-REFERENCE TO RELATED APPLICATION(S)

The present application claims priority benefit under 35 U.S.C. §119(e) of PCT/EP2011/073867, filed Dec. 22, 2011, the contents of which are incorporated herein by reference in their entirety.

TECHNICAL FIELD

The present invention relates to the field of indoor wireless communication systems and, in particular, to indoor multiple-input multiple-output (MIMO) communication systems using leaky cables for communicating with user equipment located inside a physical structure such as a building.

BACKGROUND

A large part of today's traffic load in wireless communication comes from users inside physical structures such as office buildings, shopping malls, cafés and restaurants, etc. Providing indoor users with good coverage, high bit-rate and spectrally efficient communication from base stations outside the physical structure is very challenging due to, for example, the penetration loss that occurs when the communication signals propagates through the walls of the building.

A well-known way of enhancing the indoor coverage is to deploy a wireless communication system intended for indoor usage comprising an indoor radio base station (RBS) connected to a distributed antenna system (DAS), wherein the antennas are located indoors and distributed close to the users. An example of a DAS is a so called leaky cable which essentially is coaxial cables with slots or gaps along its entire length which enable the cable to "leak" electromagnetic waves into its surroundings. A leaky cable can be used both for transmitting and for receiving electromagnetic waves, i.e. it allows for two-way communication. Leaky cables have traditionally been used in for example mines, elevator shafts, along railway tunnels, etc. but have become increasingly popular to deploy in office buildings, shopping malls and other large indoor complexes.

Multiple-input multiple-output (MIMO) communications are typically applicable indoors where high bit rates are sought after. However, leaky cables are relatively expensive and complicated to install due to their weight and stiffness, and in multiple-stream applications such as in MIMO communications several cables need to be installed more or less in parallel which complicates the installation and makes them even more expensive to use. Since a leaky cable leaks energy along its entire length, and since installations often requires quite long leaky cables, the signal-to-noise ratio (SNR) experienced by a user device located close to the end of the leaky cable is much less than if it was located at the beginning of the cable. This leads to a very skew capacity distribution along the leaky cable which is undesired. One way to combat this "capacity skewness" is to introduce multiple radio frequency amplifiers, or repeaters, along the leaky cable that may amplify the signal propagating through the cable. However, these amplifiers are not only expensive but also need power sources at each installation point which both complicates and increases the cost for the installation even more. Thus, finding a way to offer good indoor coverage with high bit-rate and spectrally efficient communication using leaky cables, which also is cost efficient and not too complex to install, is therefore highly sought for.

SUMMARY OF THE INVENTION

With the above description in mind, then, an aspect of the present invention is to provide a wireless communications system comprising a node (such as a radio base station) and at least one leaky cable which seeks to mitigate, alleviate, or eliminate one or more of the above-identified deficiencies in the art and disadvantages singly or in any combination.

A first aspect of the present invention relates to a wireless communications system for communicating with user equipment located inside a physical structure, comprising a node having at least two antenna ports and being adapted for wireless communication with said user equipment, and at least one leaky cable having two ends, characterized in that each end of said at least one leaky cable is connected to one of said antenna ports of said node, wherein said at least one leaky cable is provided at least partially inside said physical structure and being adapted for wireless communication over a radio channel with said user equipment.

The wireless communication system may further comprise a first signal divider having at least two signal divider antenna ports and at least one signal divider node port connected to one of said at least two antenna ports of said node, a second signal divider having at least two signal divider antenna ports and at least one signal divider node port connected to one of said at least two antenna ports of said node, wherein each end of said at least one leaky cable is connected, via one of said signal divider antenna ports of one of said first signal divider and said second signal divider, to one of said antenna ports of said node.

The wireless communication system wherein both ends of a first leaky cable may each be connected to one of said signal divider antenna ports of said first signal divider, while both ends of a second leaky cable may each be connected to one of said signal divider antenna ports of said second signal divider.

The wireless communication system wherein one end of a first leaky cable may be connected to one of said signal divider antenna ports of said first signal divider while the other end of said first leaky cable may be connected to one of said signal divider antenna ports of said second signal divider, and one end of a second leaky cable may be connected to one of said signal divider antenna ports of said first signal divider while the other end of said of said second leaky cable may be connected to one of said signal divider antenna ports of said second signal divider.

The wireless communication system may be adapted for wireless multiple-input multiple-output communication with said user equipment.

A second aspect of the present invention relates to a method for providing wireless communication between a node and user equipment located inside a physical structure, the method comprising configuring said node, having at least two antenna ports, for wireless communication with said user equipment, configuring at least one leaky cable, having a first end and a second end, for wireless communication, characterized by connecting each end of said at least one leaky cable to one of said antenna ports of said node, providing said at least one leaky cable at least partially inside said physical structure, and configuring said at least one leaky cable for wireless communication for over a radio channel with said user equipment.

The method may further comprise connecting a first signal divider having at least two signal divider antenna ports and at least one signal divider node port to one of said at least two antenna ports of said node, connecting a second signal divider having at least two signal divider antenna ports and at least one signal divider node port connected to one of said at least two antenna ports of said node and connecting each end of said at least one leaky cable, via one of said signal divider antenna ports of one of said first signal divider and said second signal divider, to one of said antenna ports of said node.

The method may further comprise connecting both ends of a first leaky cable to each of one of said signal divider antenna ports of said first signal divider and connecting both ends of a second leaky cable to each of one of said signal divider antenna ports of said second signal divider.

The method may further comprise connecting one end of a first leaky cable to one of said signal divider antenna ports of said first signal divider, connecting the other end of said first leaky cable to one of said signal divider antenna ports of said second signal divider, and connecting one end of a second leaky cable to one of said signal divider antenna ports of said first signal divider, and connecting the other end of said of said second leaky cable to one of said signal divider antenna ports of said second signal divider.

The method may further comprise adapting said node, said first and second signal dividers and said at least one leaky cable for wireless multiple-input multiple-output communication with said user equipment.

The method may further comprise providing said first leaky cable and said second leaky cable in said physical structure such that they are deployed in parallel to each other to provide essentially the same indoor coverage.

The method may further comprise providing said first leaky cable and said second leaky cable in said physical structure such that they are deployed to provide indoor coverage of two separate areas in said physical structure.

Any of the features in the second aspect of the present invention above may be combined, in any way possible, as to form different embodiments of the present invention. All of the benefits described in conjunction with the first aspect of the present invention may in the same way be applied to the second aspect of the present invention.

BRIEF DESCRIPTION OF THE DRAWINGS

Further objects, features, and advantages of the present invention will appear from the following detailed description of some embodiments and variants of the invention, wherein some embodiments or variants of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout the description.

One way of offering good indoor coverage along with spectrally efficient communication and high bit-rate is to utilize an indoor wireless multiple-input multiple-output (MIMO) communications system comprising a node (i.e. radio base station) and a distributed antenna system (DAS).

A DAS is typically a network of spatially separated antenna nodes connected to a common source such as a radio base station, a node or a repeater which via a radio channel provide wireless services within a physical structure. An example of a DAS is a so called leaky cable. A leaky cable is usually defined as being an insulated cable (usually a shielded coaxial cable) with slits or slots through the insulation enabling communication signals transported along its length to emanate out, in a controlled manner, into the immediately surrounding environment. Leaky cables are also known in literature as radiating cables or leaky wave slot antennas.

Figure 1:
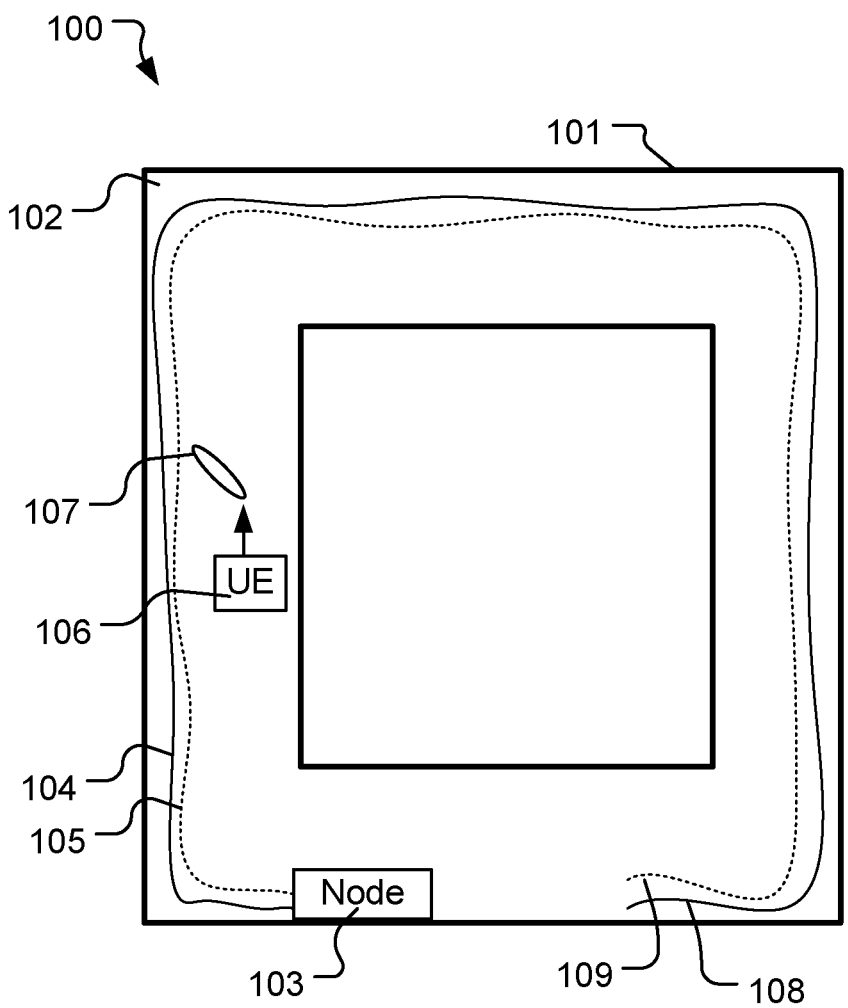
FIG. 1 illustrates a conventional diversity or MIMO setup using two parallel leaky cables connected to a node deployed along a corridor inside a physical structure, according to prior art.

FIG. 1 shows an example of a MIMO communications system 100 using leaky cables deployed in a physical structure 101.

A physical structure 101 may be any type of man made structure such as a multi-storage building having several interior spaces (such as rooms, corridors, etc.) of different sizes and shapes, to a small house-like building containing only one interior space (one room). The term physical structure 101 should also be interpreted to include any man-made or any not man-made semi-closed physical structure such as a tunnel, mine, cave or the like, wherein the leaky cable may be deployed partially inside said semi-closed physical structure and partially outside of said semi-closed physical structure. An example of a leaky cable deployed partially inside a semi-closed physical structure is a leaky cable which is deployed along a road tunnel wherein a part of the leaky cable sticks out at either end of said road tunnel. In the following examples, a physical structure 101 in the form of a square office building with a corridor 102 running along all sides of the building and with an open interior space (a garden) in the middle of the building is chosen to illustrate different embodiments and variants of embodiments according to the present invention.

In FIG. 1 a node 103, which may be a radio base station, a repeater or some other type communication device capable of handling MIMO communications, is connected to two leaky cables 104,105, one leaky cable 104 illustrated by a line running from the node 103 along the corridor 102 and terminating 108 close to the node 103, and a second leaky cable 105 illustrated by a dotted line running from the node 103 along the corridor 102 and terminating 109 close to the node 103. User equipment (UE) 106 may communicate wirelessly over a channel 107, via the leaky cables 104,105, with the node 103, which in its turn may allow said UE 106 to communicate with other UE (not shown). The UE 106 may be any type of equipment capable of communicating wirelessly such as mobile phones and computer equipment (i.e. laptops, tabletop computers, pads, etc.). The UE 106 may be stationary in said corridor 102 in the physical structure 101 or it may be capable of moving (i.e. mobile) along the corridor 102 inside the physical structure 101. The UE 106 may or may not be adapted for MIMO communication with the leaky cables 104,105 and the node 103. Each leaky cable 104,105 is provided such that they provide essentially the same unified indoor coverage of the corridor 102 in said physical structure 101. The term "essentially" should be interpreted as meaning both "exactly the same" and "close to, but not exactly the same", since in reality it would be very difficult to achieve exactly the same coverage of the corridor 102 using two physical cables (even placed on top of each other).

The MIMO communications system 100 using two leaky cables shown in FIG. 1 unfortunately have several drawbacks. Leaky cables are relatively expensive and complicated to install due to their weight and stiffness, and in multiple-stream applications such as in MIMO communications, several cables need to be installed more or less in parallel which complicates the installation process and makes the system even more expensive to implement. Since a leaky cable leaks energy along its entire length it has a large attenuation per meter cable which means that the signal-to-noise ratio (SNR) experienced by a UE 106 located close to the ends 108, 109 of the leaky cables 104,105 is much less than if the UE 106 is located at the beginning of the cables 104,105. Thus, the SNR in the part of the corridor 102 close to where the leaky cables 104,105 are connected to the node 103 is much higher than in the part of the corridor 102 at the ends 108, 109 of the leaky cables. This leads to a very skew capacity distribution along the leaky cable which is undesirable.

One way to combat the "capacity skewness" in a MIMO communication as the one shown in FIG. 1 is to introduce multiple radio frequency amplifiers, or repeaters, along the leaky cable which may amplify the signal propagating through the cable. However, these amplifiers are not only expensive but also need power sources at each installation point which both complicates the installation process and increases the cost of the communication system.

Figure 2:
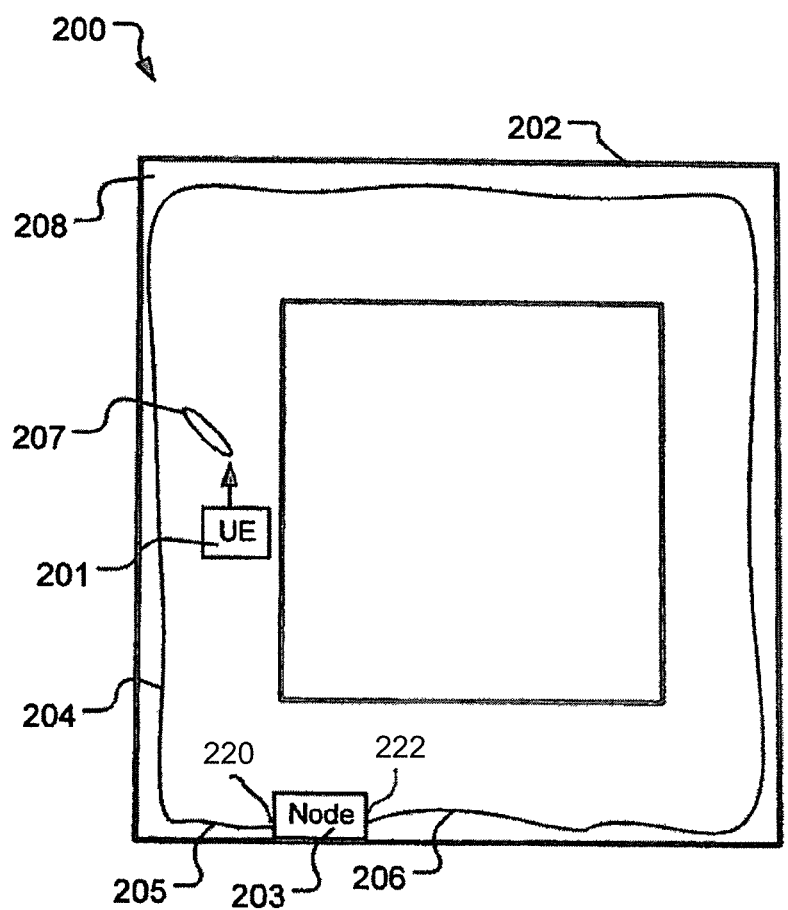
FIG. 2 illustrates a MIMO setup using a single leaky cable, connected at both ends to a node, deployed along a corridor inside a physical structure, according to an embodiment of the present invention.

As described above, a leaky cable 104, 105 has two ends whereof one end generally is used for feeding the leaky cable with a signal and the other end 108,109 is generally terminated or left open. In contrast, the present invention makes use of both ends of the leaky cable by feeding and/or sensing the cable in both ends. FIG. 2 shows a wireless MIMO communication system 200 wherein each end 205,206 of a single leaky cable 204 has been connected to a separate antenna port on a node 203. In this way it is possible for the node 203 to feed the leaky cable 204, via the node's antenna ports 220, 222, in both ends 205,206. The leaky cable 204 is distributed throughout the corridor 208 and thus providing coverage in the entire physical structure 202. UE 201 located in the corridor 208 in the physical structure 202 may communicate wirelessly with the leaky cable 204 and the node 203, via a communication channel 207, in the same manner as the UE 106 could in FIG. 1. In a transmission mode the leaky cable 204 may be used for transmitting two multiplexed data streams effectively doubling the capacity of the communication system 200 compared to a SISO system, or the leaky cable 204 may be used for diversity transmissions using for instance Alamouti space-time block-coding (STBC) giving the system an increased error resilience. Other transmission schemes, not mentioned in the description, may also be used in the MIMO communication system shown in FIG. 2.

The benefit from feeding and/or sensing the cable from both ends is that the cable length is halved compared to a conventional installation with two cables, one for each antenna port, as shown in FIG. 1. In this way the installation cost will be considerable reduced without sacrificing any of the performance. Another benefit with the invention is that a dual-feed leaky cable installation, such as the one shown in FIG. 2, will give a more uniform capacity coverage than conventional leaky cable installation with parallel cables. In this way the invention will considerably reduce the non-uniform capacity distribution inherent in conventional parallel leaky cable deployments.

Figure 3:
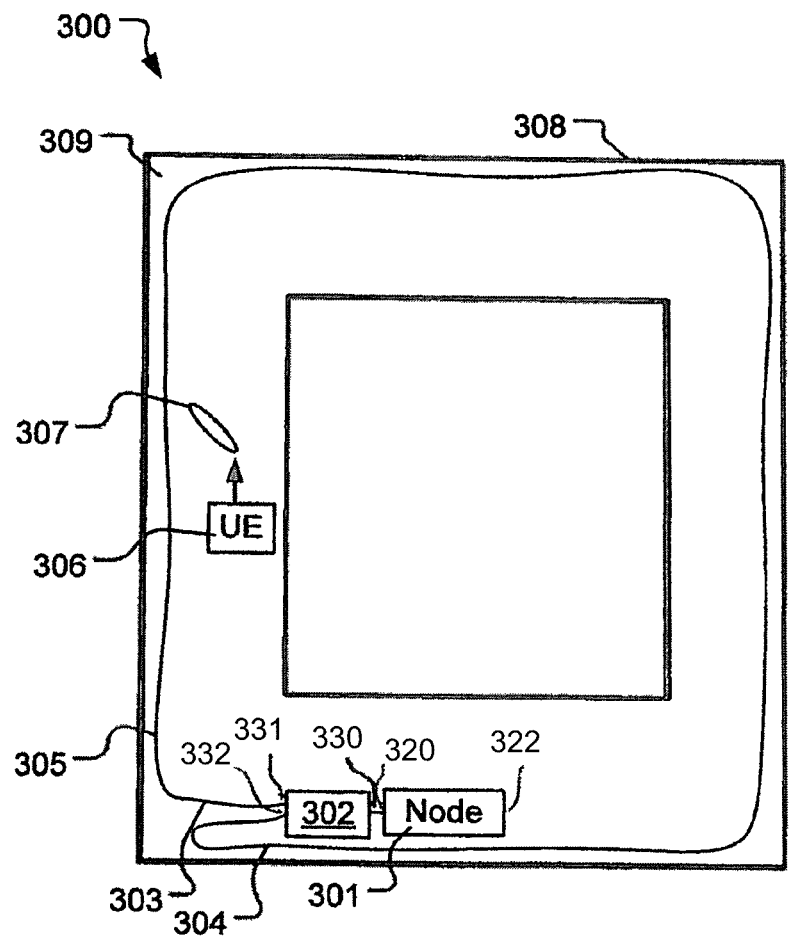
FIG. 3 illustrates a SISO or a SIMO/MISO setup using a single leaky cable, connected at both ends to a signal divider connected to a node, deployed along a corridor inside a physical structure, according to an embodiment of the present invention.

FIG. 3 shows another embodiment of a communication system 300 according to the present invention. In this embodiment both ends 303,304 of the leaky cable 305 are connected to signal divider antenna ports 331, 332 on a signal divider 302. The signal divider 302 is capable of either combining signals or splitting signals. An antenna port 320, 322 on said node 301 is connected to a signal divider node port 330 on said signal divider 302, and thus enabling the node 301 to simultaneously feed the leaky cable 305 at both ends 303, 304 via the signal divider 302. The leaky cable 305 is distributed throughout the corridor 309 and thus covering the entire physical structure 308. UE 306 located in the corridor 309 in the physical structure 308 thus is able to communicate wirelessly with the leaky cable 305 and the node 301 via a communication channel 307. In the same manner as the dual-feed leaky cable installation in FIG. 2, the dual-feed leaky cable installation in FIG. 3 will also give a more uniform capacity coverage than conventional leaky cable installation with parallel cables or a single cable only fed from one end. In this way the installation in FIG. 3 will considerably reduce the non-uniform capacity distribution inherent in conventional parallel leaky cable deployments where the cables are fed from one end only.

Figure 4:
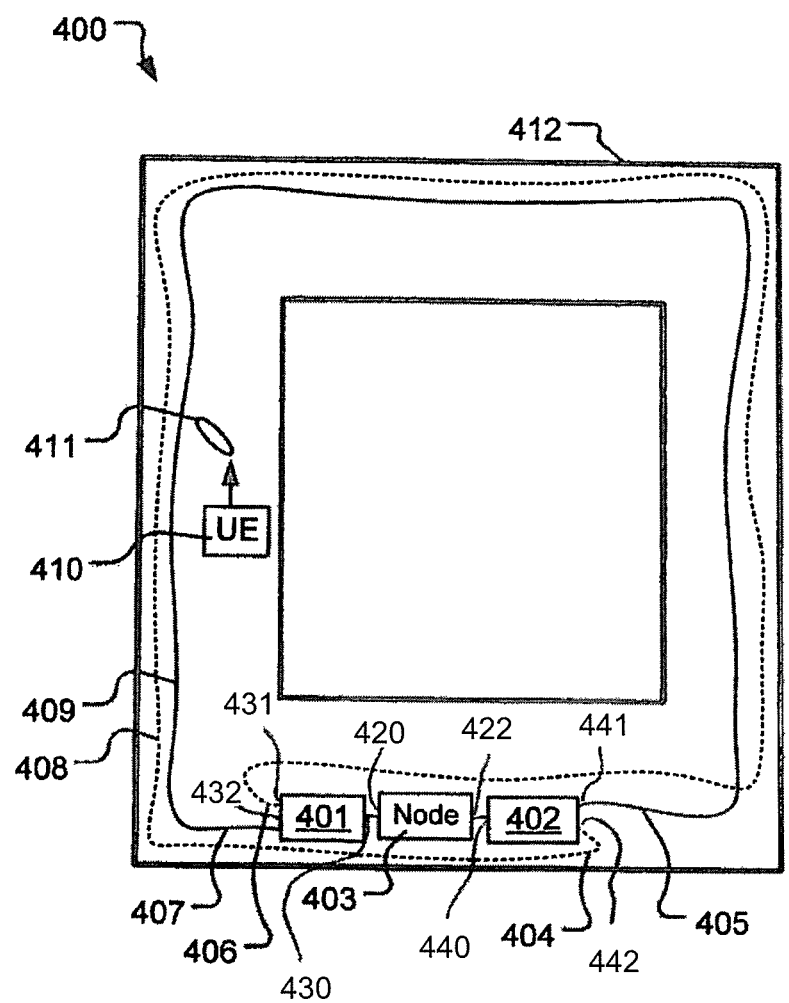
FIG. 4 illustrates a MIMO setup using two leaky cables, connected to two signal dividers connected to a node, deployed along a corridor inside a physical structure, according to an embodiment of the present invention.

FIG. 4 shows an embodiment of the present invention where two leaky cables 408,409 are connected to a node 403 via signal dividers 401,402. In this embodiment one end 404,405 of each leaky cable 408,409 is connected to one of the signal dividers 402, while the other end 406,407 of each leaky cable 408,409 are connected to the other signal divider 401. The ends 404,405,406,407 of the leaky cables 408,409 are connected to the signal dividers 401,402 via its signal divider antenna ports 431, 432, 441, 442, and the signal dividers 401,402 are in their turn connected to antenna ports 420, 422 of the node 403 via signal divider node ports 430, 440. In this way the node 403 is able to feed both ends 404,405,406,407 of each leaky cable 408,409 at the same time with a same signal (i.e. meaning that one signal is fed to both ends 404,405 connected to the same signal divider 402 while another signal is fed to both ends 406,407 connected to the same signal divider 401). Feeding the same signal at both ends 404,405,406,407 of each leaky cable 408,409 will result in a more even power distribution along the leaky cables 408,409, where the power of the same signal will be high close to the ends 404,405,406,407 of each leaky cable 408, 409, and sum up due to power contribution from both directions at the middle of each leaky cable 408,409 where the signal power otherwise would (if not fed from both ends) have been weak due to the cable losses. Thus the benefits of deploying a communication system 400 as shown in FIG. 4 is that it will provide a more uniform capacity distribution along the whole length of the leaky cables, and that it can be configured to operate both as a single-input single-output (SISO) system as well as a MIMO system. However, these benefits will come at the price of a higher installation and material cost (more cable is used).

In a variant of the embodiment shown in FIG. 4, the node 403 may feed the ends 404,405,406,407 of the leaky cables 408,409 with different signals, i.e. one end 404,405 of the leaky cables 408,409 is fed with a first signal and the second end 406,407 of the leaky cables 408,409 is fed with a second signal.

Figure 5:
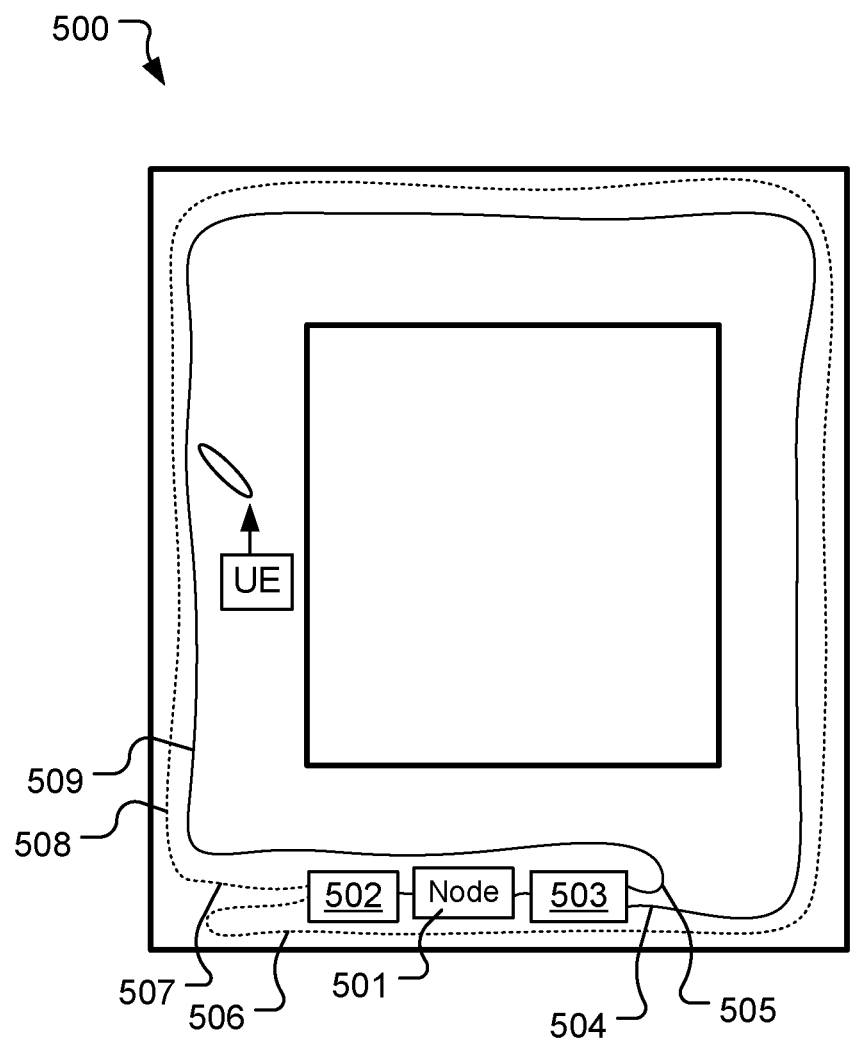
FIG. 5 illustrates another MIMO setup using two leaky cables, connected to two signal dividers connected to a node, deployed along a corridor inside a physical structure, according to an embodiment of the present invention.

FIG. 5 shows a similar embodiment to the one disclosed in FIG. 4. However, in this embodiment both ends 504,505, 506,507 of each leaky cable 508,509 is connected to the same signal divider 502,503, i.e. both ends 504,505 of one of the leaky cables 509 are connected to one of the signal dividers 503, while both ends 506,507 of the other leaky cable 508 is connected to the other signal divider 502. In this way the node 501 may, in a similar manner as in the embodiment in FIG. 4, feed both ends 504,505, 506,507 of each leaky cable 508,509 with the same signal via the signal dividers 502,503. The benefits and the performance of the embodiment shown in FIG. 5 is the same as the benefits and performances of the embodiments shown in FIG. 4. The embodiment in FIG. 5 also provides the possibility for the node 501 to feed each leaky cable 508,509 via the signal dividers 502,503 with different signals.

Figure 6A:
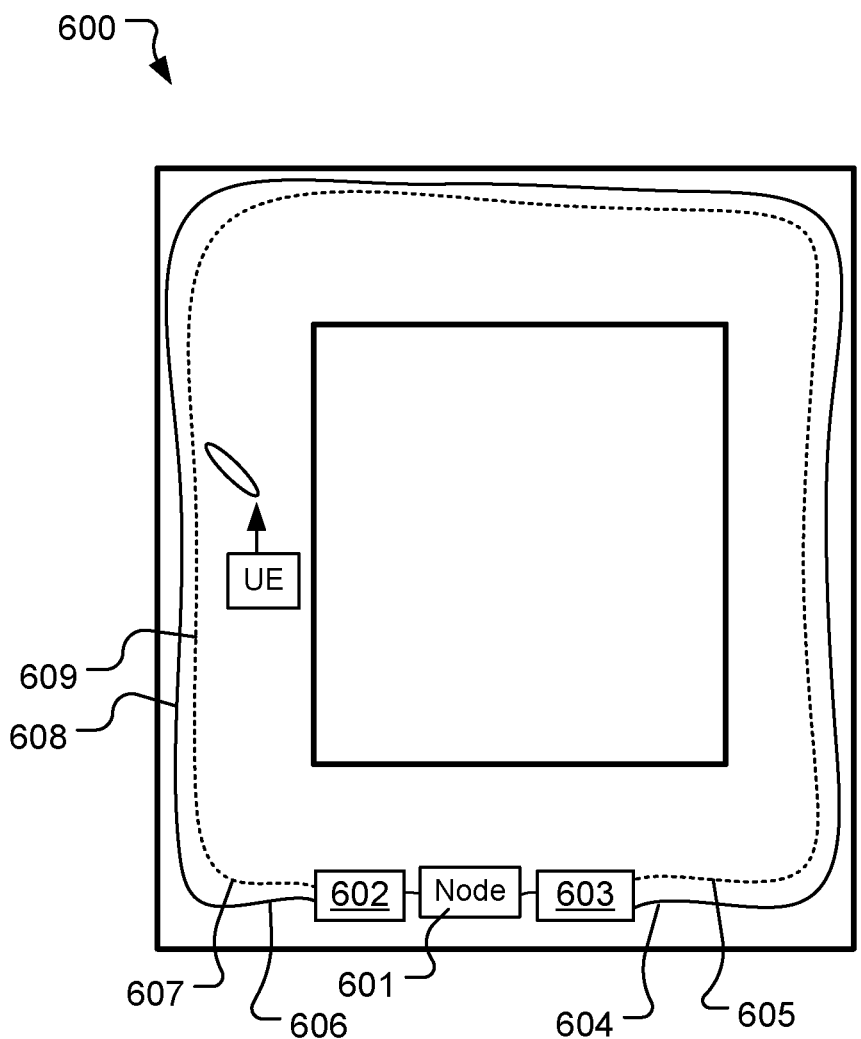
FIG. 6a illustrates yet another MIMO setup using two leaky cables, connected to two signal dividers connected to a node, deployed along a corridor inside a physical structure, according to an embodiment of the present invention.

FIG. 6a shows yet another similar embodiment to the ones disclosed in FIG. 4 and FIG. 5. However, in this embodiment one end 604,605 of each leaky cable 608,609 is connected to one of the signal dividers 603, while the other end 606,607 of each leaky cable 608,609 is connected to the other signal divider 602. However, it should be noted that the deployment of the two leaky cables 608,609 in the communication system 600 in FIG. 6a is fundamentally different from the deployment of the two leaky cables 408,409 in the communication system 400 in FIG. 4, and the effect of applying a signal to the leaky cables in the two embodiments will be quite different. The communication system 600 disclosed in FIG. 6a is essentially equal in terms of benefits and performance as the communication system 200 presented in FIG. 2, with the difference that the communication system 600 in FIG. 6a is deployed using two leaky cables 608,609.

Figure 6B:
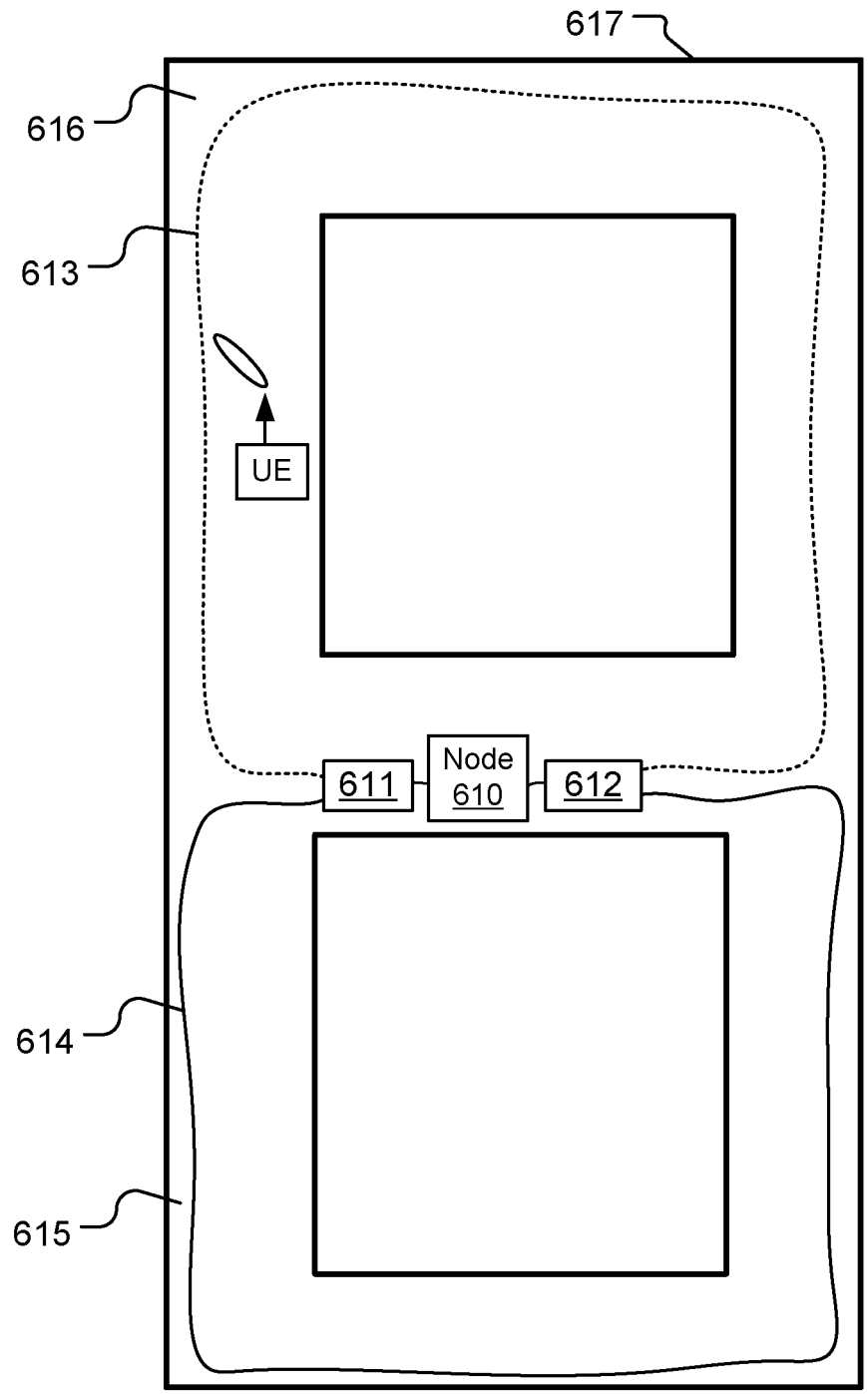
FIG. 6b illustrates a MIMO setup using two leaky cables, connected to two signal dividers connected to a node, deployed along two corridors inside a physical structure, according to an embodiment of the present invention.

One beneficial way of deploying the leaky cables in the communication system 600 is shown in FIG. 6b. In this variant one leaky cable 613 is deployed in a corridor 616 in a first part of the physical structure 617, while the other leaky cable 614 deployed in another corridor 615 in a second part of the physical structure 617. Both leaky cables 613,614 are connected to the node 610 via two signal dividers 611,612 in the same manner as shown in the communication system 600 shown in FIG. 6a. In this way one leaky cable 613 serves one part 616 of the building 617 while the other leaky cable 614 serves another part 615 of the building 617 using only one set of two signal dividers and a node.

One should also note that all the embodiments shown in FIGS. 2-6b may be extended to higher order MIMO simply by increasing the number of cables, as long as it is supported by the node.

Figure 7:
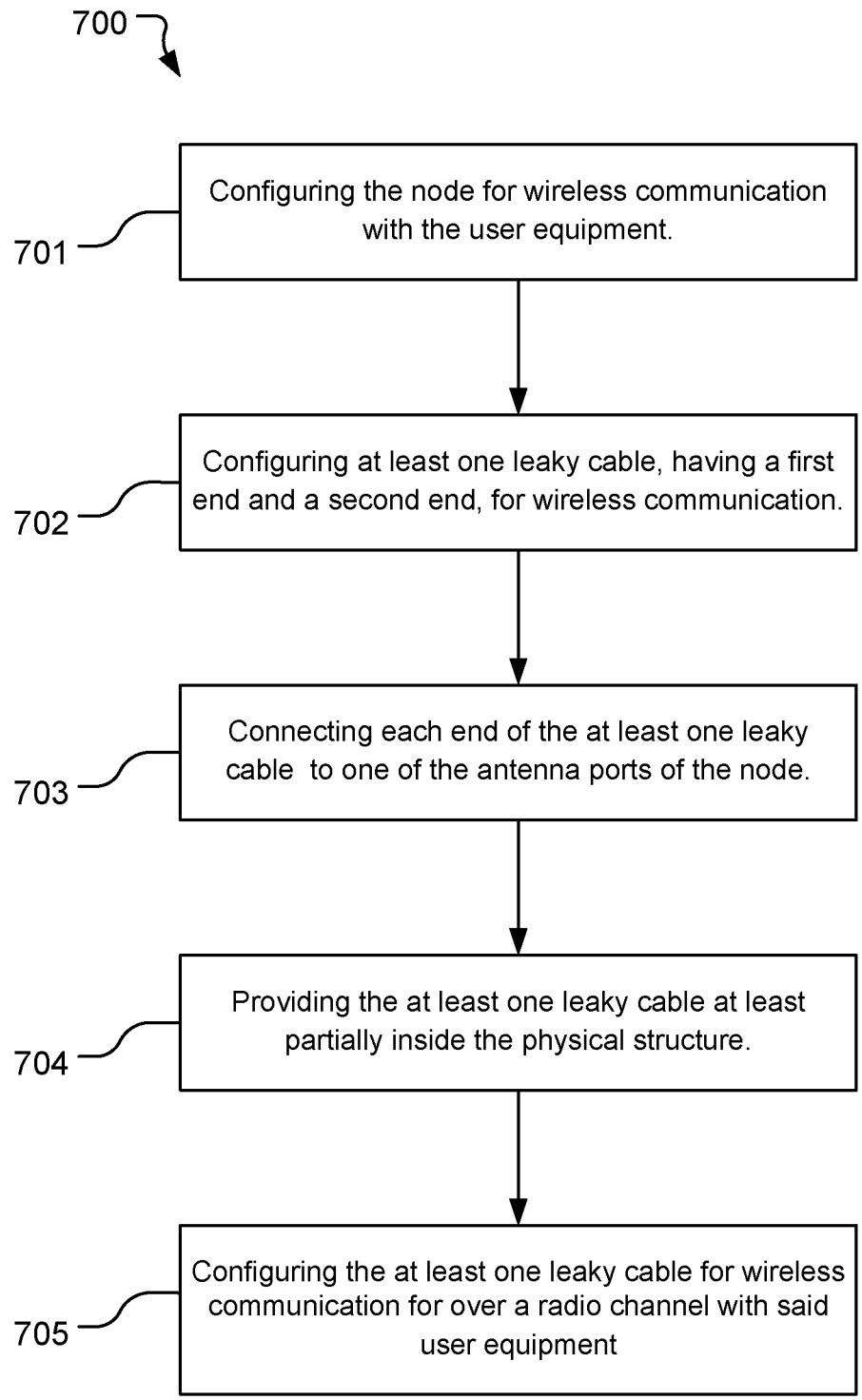
FIG. 7 shows a flowchart describing a method according to an embodiment of the present invention.

It has been showed above that the present invention disclose a method for providing wireless communication between a node and user equipment located inside a physical structure. The method may be expressed through a number of steps (as shown in the flowchart in FIG. 7) according to the following:

Configuring (701) the node, having at least two antenna ports, for wireless communication with user equipment.

Configuring (702) at least one leaky cable, having a first end and a second end, for wireless communication.

Connecting (703) each end of the at least one leaky cable to one of the antenna ports of said node.

Providing (704) the at least one leaky cable at least partially inside said physical structure.

Configuring (705) the at least one leaky cable for wireless communication for over a radio channel with said user equipment.

Figure 8:
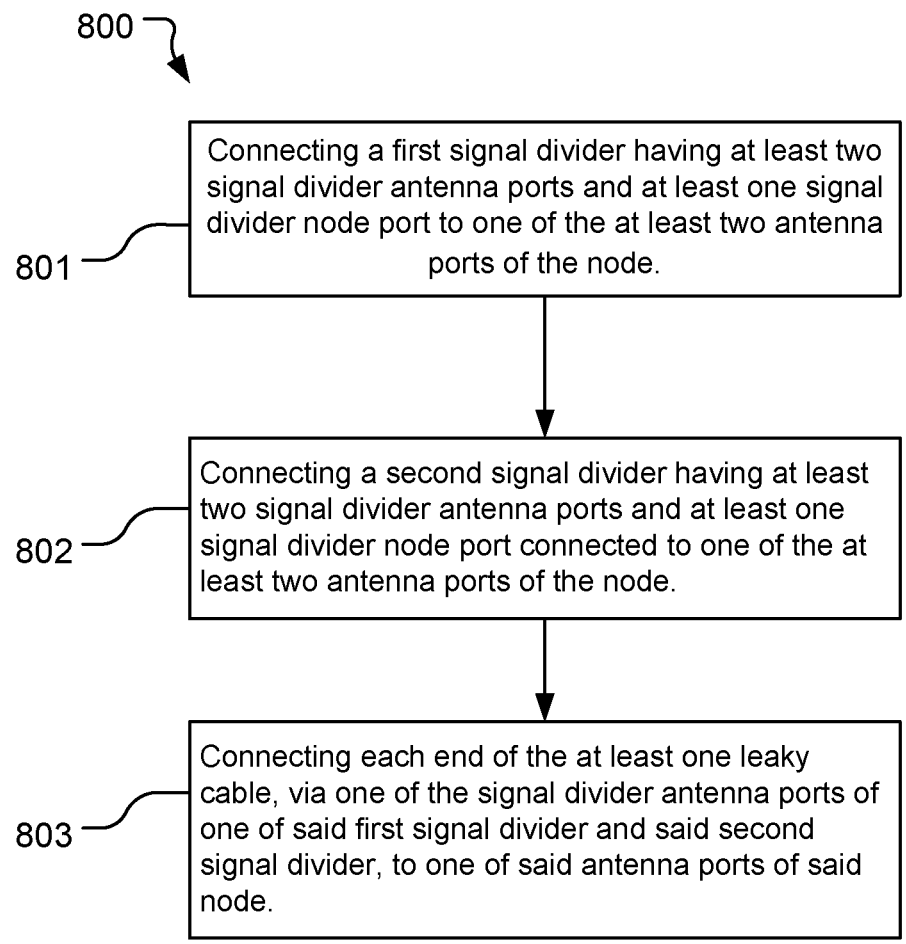
FIG. 8 shows another flowchart describing a method according to an embodiment of the present invention.

The method according to the present invention may also comprise the following further steps (as shown in the flowchart in FIG. 8):

Connecting (801) a first signal divider having at least two signal divider antenna ports and at least one signal divider node port to one of the at least two antenna ports of the node.

Connecting (802) a second signal divider having at least two signal divider antenna ports and at least one signal divider node port connected to one of the at least two antenna ports of the node.

Connecting (803) each end of the at least one leaky cable, via one of the signal divider antenna ports of one of said first signal divider and said second signal divider, to one of said antenna ports of said node.

To illustrate the difference in capacity distribution between the prior art communication system depicted in FIG. 1 and the communication system according to the present invention depicted in FIG. 2 two simulations have been performed. The simulations where made using a model of a 2-by-2 MIMO communication system using leaky cables with an attenuation equal to 20 dB/100 m. The antenna port isolation was chosen to 20 dB which is roughly the same as in a conventional antenna solution. The length of each side (i.e. the length of each corridor) of the physical structure was set to 25 m, which gives that each leaky cable has to be 100 m long (4×25 m) in the simulation. The total transmit power was set to 24 dBm and the receiver noise power was normalized such that a received target SNR either of 10 or 30 dB was achieved close to the node (i.e. at the point where there is no cable attenuation and only path loss present). Uncorrelated Rayleigh fading and an indoor path loss model are assumed and that the receiver is located a few meters away from the cable. Two scenarios were simulated and compared to each other. The first scenario is the conventional parallel leaky cable scenario depicted in FIG. 1, while the second scenario is the disclosed dual-feed leaky cable scenario depicted in FIG. 2.

Figure 9A:
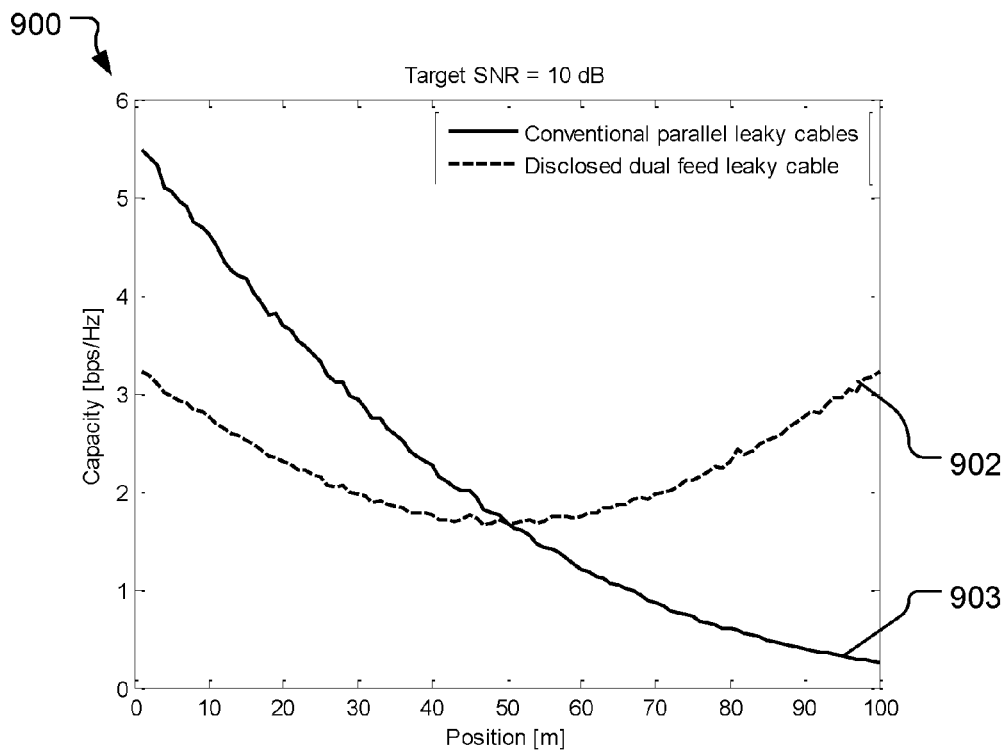
FIG. 9a shows a simulation of the 2-by-2 MIMO capacity, with a target SNR of 20 dB, along a corridor when using a deployment with two parallel leaky cables compared to a deployments with a single leaky cable fed from both ends, according to an embodiment of the present invention.

FIG. 9a shows the resulting diagram 900 from a first simulation wherein the target SNR was set to 10 dB. The y-axis in the diagram represents capacity (bps/Hz) and the x-axis in the diagram represents position (m). It can be clearly seen from the diagram that the curve belonging to the conventional parallel leaky cable scenario 903 that the capacity, as expected, rapidly decreases with position. In contrast the curve belonging to the disclosed dual-feed leaky cable scenario 902 is bathtub-shaped which indicates that the capacity distribution is as expected lowest on the middle of the cable (at 50 m) and high at both ends. It should be noted that the variation in capacity between the ends and the middle of the cable is not that great which indicated that it is very beneficial to use the disclosed dual-feed leaky cable deployment if an even capacity distribution is wanted.

Figure 9B:
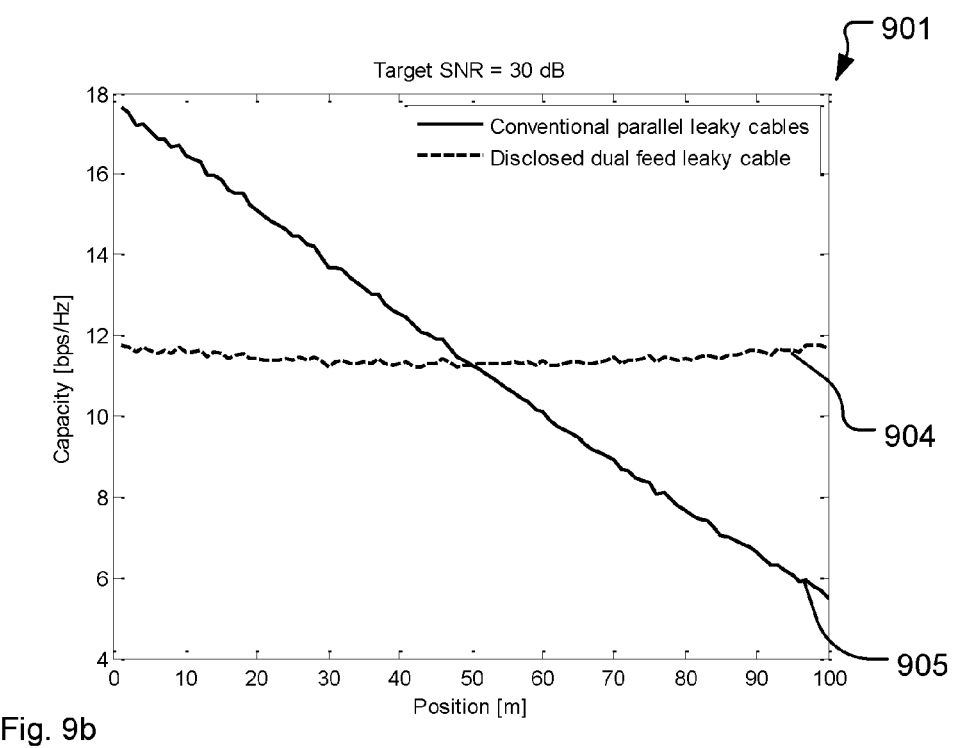
FIG. 9b shows a simulation of the 2-by-2 MIMO capacity, with a target SNR of 30 dB, along a corridor when using a deployment with two parallel leaky cables compared to a deployments using a single leaky cable fed from both ends according to an embodiment of the present invention.

FIG. 9b shows the resulting diagram 901 from a second simulation wherein the target SNR was set to 30 dB. The y-axis in the diagram represents capacity (bps/Hz) and the x-axis in the diagram represents position (m). It can be clearly seen from the diagram that the curve belonging to the conventional parallel leaky cable scenario 905 that the capacity, as expected, rapidly decreases with position. In contrast the curve belonging to the disclosed dual-feed leaky cable scenario 904 is nearly flat which indicated that the change in capacity over the length of the leaky cable is nearly unchanged. This indicates that it is very beneficial to use the disclosed dual-feed leaky cable deployment if an even capacity distribution is wanted, especially for high SNRs. One conclusion from the results presented in FIGS. 9a and 9b that can be drawn is that the higher the target SNR is the more uniform the capacity distribution gets, and uniform capacity distributions are very much desired in communication systems.

Figure 10:
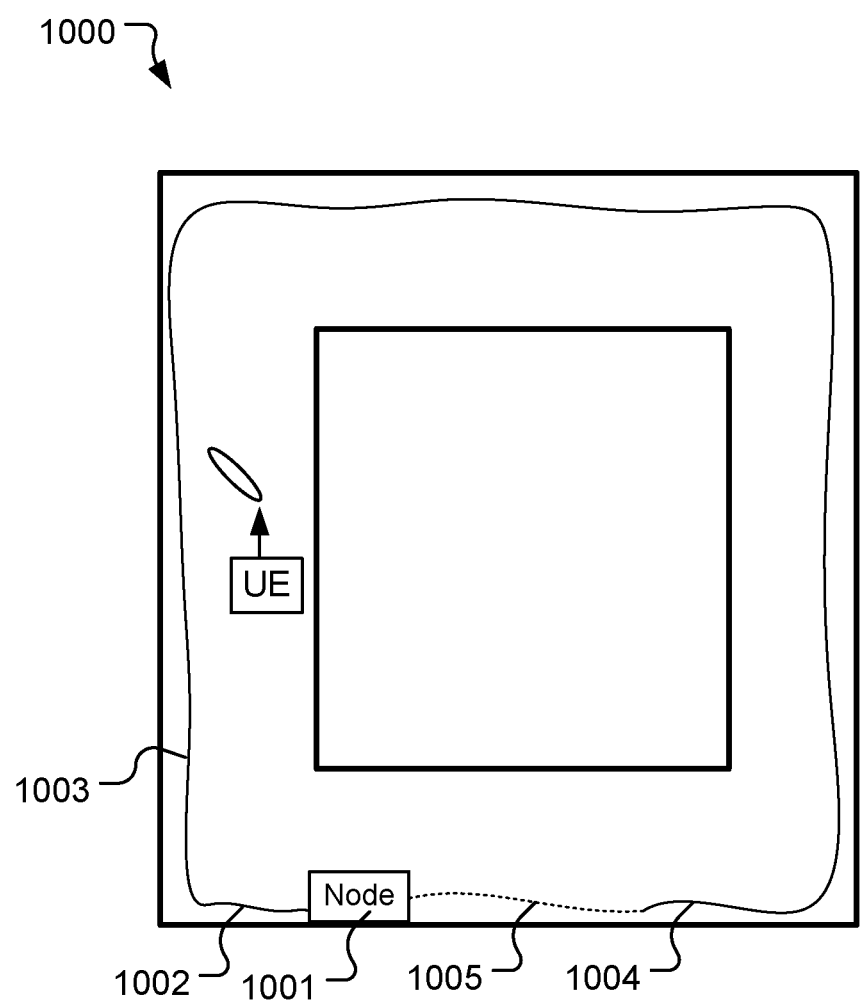
FIG. 10 shows an example of how an installation of a single leaky cable system arranged for SISO communication according to prior art may be modified, at low cost, to a leaky cable system arranged for MIMO communication according to an embodiment of the present invention.

Another benefit of using the present invention is that communication systems using a single leaky cable for SISO transmission in an existing deployment can easily be upgraded to MIMO or diversity transmission/reception using the present invention. The requirement for doing this upgrade is to provide the possibility to feed both ends of the cable from the same location (radio base station or repeater). The complexity of such an upgrade depends on the current installation which most likely varies from site to site. FIG. 10 shows a scenario where an old deployment 1000 of a leaky cable 1003 connected at one end 1002 to a node 1001 and having the other end open or terminated 1004 may be patched with a piece of leaky cable 1005 so that the patched leaky cable 1003 may be fed in both ends according to the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A wireless communications system for communicating with user equipment located inside a physical structure, comprising:
   a node having at least two antenna ports and being adapted for wireless communication with said user equipment, and
   at least one leaky cable having only two ends, the two ends comprising a first end and a second end located at opposing ends of said at least one leaky cable and said at least one leaky cable being a continuous cable,
   wherein the first end of said at least one leaky cable is connected to one of said antenna ports of said node and the second end of said at least one leaky cable is connected to a different one of said antenna ports of said node, wherein said at least one leaky cable is provided at least partially inside said physical structure and being adapted for wireless communication over a communication channel with said user equipment, and
   wherein the node is configured to feed said at least one leaky cable from both the first end and the second end.

2. The wireless communication system according to claim 1, further comprising:
   a first signal divider having at least two signal divider antenna ports and at least one signal divider node port connected to one of said at least two antenna ports of said node;
   a second signal divider having at least two signal divider antenna ports and at least one signal divider node port connected to one of said at least two antenna ports of said node;
   wherein the first end of said at least one leaky cable is connected, via one of said signal divider antenna ports of said first signal divider, to one of said antenna ports of said node and the second end of said at least one leaky cable is connected, via one of said signal divider antenna ports of said second signal divider, to a different one of said antenna ports of said node.

3. The wireless communication system according to claim 2, wherein both ends of a first leaky cable is each connected to one of said signal divider antenna ports of said first signal divider, while both ends of a second leaky cable is each connected to one of said signal divider antenna ports of said second signal divider.

4. The wireless communication system according to claim 2, wherein one end of a first leaky cable is connected to one of said signal divider antenna ports of said first signal divider while the other end of said first leaky cable is connected to one of said signal divider antenna ports of said second signal divider, and
   one end of a second leaky cable is connected to one of said signal divider antenna ports of said first signal divider while the other end of said of said second leaky cable is connected to one of said signal divider antenna ports of said second signal divider.

5. The wireless communication system according to claim 1, wherein the system is adapted for wireless multiple-input multiple-output communication with said user equipment.

6. The wireless communication system according to claim 1, further comprising:
   a first signal divider having at least two signal divider antenna ports and at least one signal divider node port connected to one of said at least two antenna ports of said node;
   wherein the first end of said at least one leaky cable is connected, via one of said signal divider antenna ports of said first signal divider, to one of said antenna ports of said node, and the second end of said at least one leaky cable is connected, via one of said signal divider antenna ports of said first signal divider, to the same one of said antenna ports of said node.

7. A method for providing wireless communication between a node and user equipment located inside a physical structure, the method comprising:
   configuring said node, having at least two antenna ports, for wireless communication with said user equipment,
   configuring at least one leaky cable, having only two ends, the two ends comprising a first end and a second end located at opposing ends of said at least one leaky cable, for wireless communication and said at least one leaky cable being a continuous cable,
   connecting the first end of said at least one leaky cable to one of said antenna ports of said node and connecting the second end of said at least one leaky cable to a different one of said antenna ports of said node,
   providing said at least one leaky cable at least partially inside said physical structure, and
   configuring said at least one leaky cable for wireless communication for over a communication channel with said user equipment, and
   wherein the node is configured to feed said at least one leaky cable from both the first end and the second end.

8. The method according to claim 7, further comprising:
   connecting a first signal divider having at least two signal divider antenna ports and at least one signal divider node port to one of said at least two antenna ports of said node;
   connecting a second signal divider having at least two signal divider antenna ports and at least one signal divider node port connected to one of said at least two antenna ports of said node; and
   connecting the first end and the second end of said at least one leaky cable, via one of said signal divider antenna ports of one of said first signal divider and said second signal divider, to one of said antenna ports of said node.

9. The method according to claim 8, further comprising:
   connecting both ends of a first leaky cable to each of one of said signal divider antenna ports of said first signal divider; and
   connecting both ends of a second leaky cable to each of one of said signal divider antenna ports of said second signal divider.

10. The method according to claim 9, further comprising:
    providing said first leaky cable and said second leaky cable in said physical structure such that they are deployed in parallel to each other to provide essentially the same indoor coverage.

11. The method according to claim 9, further comprising:
    providing said first leaky cable and said second leaky cable in said physical structure to provide indoor coverage of two separate areas in said physical structure.

12. The method according to claim 8, further comprising:
    connecting one end of a first leaky cable to one of said signal divider antenna ports of said first signal divider,
    connecting the other end of said first leaky cable to one of said signal divider antenna ports of said second signal divider, and
    connecting one end of a second leaky cable to one of said signal divider antenna ports of said first signal divider, and
    connecting the other end of said of said second leaky cable to one of said signal divider antenna ports of said second signal divider.

13. The method according to claim 8, further comprising:
    adapting said node, said first and second signal dividers and said at least one leaky cable for wireless multiple-input multiple-output communication with said user equipment.

* * * * *

UNITED STATES PATENT AND TRADEMARK OFFICE
CERTIFICATE OF CORRECTION

| | | |
|---|---|---|
| PATENT NO. | : 9,331,374 B2 | Page 1 of 1 |
| APPLICATION NO. | : 13/338522 | |
| DATED | : May 3, 2016 | |
| INVENTOR(S) | : Coldrey et al. | |

It is certified that error appears in the above-identified patent and that said Letters Patent is hereby corrected as shown below:

In the specification,

In Column 1, Line 25, delete "café s" and insert -- cafés --, therefor.

In the claims,

In Column 10, Line 47, in Claim 2, delete "the first end" and insert -- each end --, therefor.

In Column 11, Line 1, in Claim 4, delete "of said of said" and insert -- of said --, therefor.

In Column 12, Line 35, in Claim 12, delete "of said of said" and insert -- of said --, therefor.

Signed and Sealed this
Second Day of August, 2016

Michelle K. Lee
*Director of the United States Patent and Trademark Office*